(12) United States Patent
Chen

(10) Patent No.: US 10,045,000 B1
(45) Date of Patent: Aug. 7, 2018

(54) METHOD AND SYSTEM FOR OMNI-DIRECTIONAL AUDIO SIGNAL ACQUISITION AND PLAYBACK

(71) Applicant: Scott Zhihao Chen, Irvine, CA (US)

(72) Inventor: Scott Zhihao Chen, Irvine, CA (US)

(*) Notice: Subject to any disclaimer, the term of this patent is extended or adjusted under 35 U.S.C. 154(b) by 0 days.

(21) Appl. No.: 15/394,652

(22) Filed: Dec. 29, 2016

(51) Int. Cl.
*H04N 9/80* (2006.01)
*H04N 5/92* (2006.01)
*H04N 9/802* (2006.01)
*H04R 1/40* (2006.01)
*H04S 7/00* (2006.01)
*H04R 5/027* (2006.01)
*H04R 5/02* (2006.01)
*H04N 5/84* (2006.01)
*H04N 5/89* (2006.01)

(52) U.S. Cl.
CPC ............ *H04N 9/802* (2013.01); *H04R 1/406* (2013.01); *H04R 5/02* (2013.01); *H04R 5/027* (2013.01); *H04S 7/303* (2013.01); *H04S 2400/01* (2013.01); *H04S 2400/15* (2013.01)

(58) Field of Classification Search
CPC .. H04N 9/80; H04N 5/92; H04N 5/84; H04N 5/89

USPC ............... 386/338, 339, 326, 248, 239, 335
See application file for complete search history.

(56) References Cited

U.S. PATENT DOCUMENTS

2013/0176403 A1* 7/2013 Varga ................. H04N 13/0242
348/48

* cited by examiner

*Primary Examiner* — Daquan Zhao

(57) ABSTRACT

An omni-directional audio signal acquisition and playback system is disclosed. In some embodiments, the described system includes a set of microphones positioned substantially evenly with respect to a center of the audio signal acquisition environment, the set of microphones are configured to acquire multiple channels of omni-directional audio signals. The system further includes one or more processors configured to: determine current positions of both the left and the right ears of a viewer's head; identify a subset of microphones within the set of microphones which is closest to the current positions of the left and right ears of the viewer's head; and compute a left channel and a right channel of audio output signals using the omni-directional audio signals recorded by the identified subset of microphones. The system also includes a set of audio output devices configured to playback the left channel and the right channel of audio output signals for the left ear and the right ear of the viewer, respectively.

20 Claims, 6 Drawing Sheets

METHOD AND SYSTEM FOR OMNI-DIRECTIONAL AUDIO SIGNAL ACQUISITION AND PLAYBACK

TECHNICAL FIELD

The present disclosure generally relates to the field of panoramic imaging systems, and more specifically to systems and techniques for achieving 360° omni-directional audio collection and playback for panoramic imaging systems.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, panoramic video systems on the market have provided viewers with 360° omni-directional visual experiences. To go one step further, some panoramic video systems have been designed to create a "virtual reality" experience for a viewer when watching a panoramic movie by capturing 3-dimensional (3D) panoramic video images and playing back panoramic video images in 3D to the viewer. However, the existing panoramic video systems are not capable of provide 360° omni-directional sound field experiences to a viewer.

SUMMARY

Described herein are systems and techniques for recording 360° omni-directional audio signals when using a panoramic imaging system to capture 360° omni-directional video images and playing back such 360° omni-directional audio signals in a panoramic movie environment. In some embodiments, to collection 360° omni-directional audio signals, a set of microphones are distributed in a discrete manner and substantially evenly with respect to a center of the audio signal acquisition environment to collect multiple channels of audio signals from different directions. The collected multiple channels of audio signals are subsequently used to generate a left channel and a right channel of audio signals to be output to the left ear and the right ear of a viewer, respectively, during a playback process. In some embodiments, to create a realistic sound field environment during the playback process, the audio signals played back and heard by a person changes as the person rotates his head (to change the view angle) so as to match the sound effects with the panoramic visual effects received by the person. As a result, the disclosed systems and techniques allow for a consistent 360° omni-directional visual and audio experience within a simulated reality environment.

In one aspect, a process of dynamically generating audio output signals based on a viewer's viewing angle within a panoramic video environment is disclosed. This process starts by acquiring multiple channels of omni-directional audio signals using a set of microphones positioned within an audio signal acquisition environment, wherein the set of microphones are positioned substantially evenly with respect to a center of the audio signal acquisition environment. Next, during panoramic video playback, the process defines a position of the viewer's head to coincide with a center of the audio signal acquisition environment and subsequently determines current positions of both the left and the right ears of the viewer's head. The process then identifies a subset of microphones within the set of microphones which is closest to the current positions of the left and right ears of the viewer's head. The process next computes multiple channels of audio output signals using the omni-directional audio signals recorded by the identified subset of microphones.

In some implementations, after acquiring the multiple channels of omni-directional audio signals, the process also converts the multiple channels of omni-directional audio signals to corresponding digital audio streams which are subsequently stored.

In some implementations, positioning the set of microphones within the audio signal acquisition environment includes positioning the set of microphones substantially evenly around a 360° circle at substantially equal distances toward the center of the audio signal acquisition environment.

In some implementations, the set of microphones includes 8 microphones positioned at a 45° angular spacing around the 360° circle.

In some implementations, the process determines the current position of the left ear of the viewer's head by determining a first angle formed between a first line connecting the left ear and the position of the viewer's head and a reference line connecting a reference point positioned on the 360° circle and the position of the viewer's head. Similarly, the process determines the current position of the right ear of the viewer's head includes determining a second angle formed between a second line connecting the right ear and the position of the viewer's head and the reference line connecting the reference point and the position of the viewer's head.

In some implementations, the process identifies a subset of microphones closest to the current position of the left ear of the viewer's head by: for each microphone in the set of microphones, determining an angle formed between a line connecting the microphone and the position of the viewer's head and the reference line; and determining an angular difference between the angle with the first angle. The process then identifies a first subset of microphones in the set of microphones which has the smallest angular differences.

In some implementations, the process identifies a subset of microphones closest to the current position of the right ear of the viewer's head by: for each microphone in the set of microphones, determining an angle formed between a line connecting the microphone and the position of the viewer's head and the reference line; and determining an angular difference between the angle with the second angle. The process then identifies a second subset of microphones in the set of microphones which has the smallest angular differences.

In some implementations, the process computes multiple channels of audio output signals by computing a left audio channel output for the left ear and a right audio channel output for the right ear.

In some implementations, the process computes the left audio channel output for the left ear by computing a first weighted combination of the audio signals recorded by the identified subset of microphones closest to the current position of the left ear; and computes the right audio channel output for the right ear by computing a second weighted combination of the audio signals recorded by the identified subset of microphones closest to the current position of the right ear.

In some implementations, the process outputs the left audio channel and the right audio channel for the left ear and the right ear of the viewer, respectively.

In another aspect, an omni-directional audio signal acquisition and playback system is disclosed. This system includes a set of microphones positioned substantially evenly with respect to a center of the audio signal acquisition environment, wherein the set of microphones are configured to acquire multiple channels of omni-directional audio signals. The system further includes one or more processors configured to: define a position of a viewer's head to coincide with a center of the audio signal acquisition environment; determine current positions of both the left and the right ears of the viewer's head; identify a subset of microphones within the set of microphones which is closest to the current positions of the left and right ears of the viewer's head; and compute a left channel and a right channel of audio output signals using the omni-directional audio signals recorded by the identified subset of microphones. The system also includes a set of audio output devices configured to playback the left channel and the right channel of audio output signals for the left ear and the right ear of the viewer, respectively.

In some implementations, the system further includes an AD conversion (ADC) unit configured to convert the multiple channels of omni-directional audio signals to corresponding digital audio streams.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
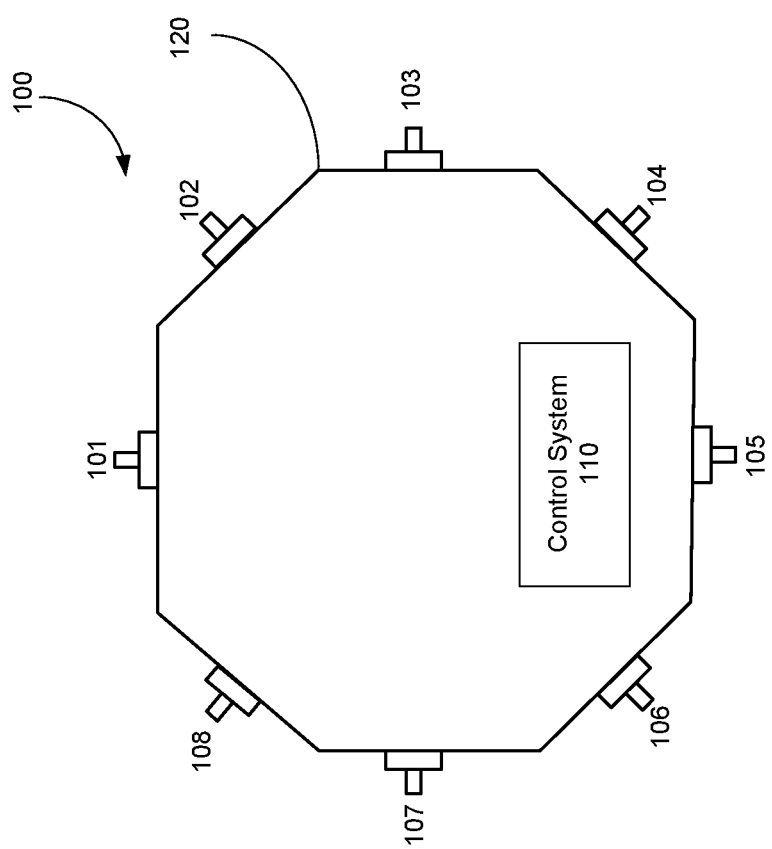
FIG. 1 is a schematic top view of an example panoramic imaging system according to certain aspects of the disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are systems and techniques for recording 360° omni-directional audio signals when using a panoramic imaging system to capture 360° omni-directional video images and playing back such 360° omni-directional audio signals in a panoramic movie environment. In some embodiments, to collection 360° omni-directional audio signals, a set of microphones are distributed in a discrete manner and substantially evenly with respect to a center of the audio signal acquisition environment to collect multiple channels of audio signals from different directions. The collected multiple channels of audio signals are subsequently used to generate a left channel and a right channel of audio signals to be output to the left ear and the right ear of a viewer, respectively, during a playback process. In some embodiments, to create a realistic sound field environment during the playback process, the audio signals played back and heard by a person changes as the person rotates his head (to change the view angle) so as to match the sound effects with the panoramic visual effects received by the person. As a result, the disclosed systems and techniques allow for a consistent 360° omni-directional visual and audio experience within a simulated reality environment.

In one aspect, a process of dynamically generating audio output signals based on a viewer's viewing angle within a panoramic video environment is disclosed. This process starts by acquiring multiple channels of omni-directional audio signals using a set of microphones positioned within an audio signal acquisition environment, wherein the set of microphones are positioned substantially evenly with respect to a center of the audio signal acquisition environment. Next, during panoramic video playback, the process defines a position of the viewer's head to coincide with a center of the audio signal acquisition environment and subsequently determines current positions of both the left and the right ears of the viewer's head. The process then identifies a subset of microphones within the set of microphones which is closest to the current positions of the left and right ears of the viewer's head. The process next computes multiple channels of audio output signals using the omni-directional audio signals recorded by the identified subset of microphones.

In another aspect, an omni-directional audio signal acquisition and playback system is disclosed. This system includes a set of microphones positioned substantially evenly with respect to a center of the audio signal acquisition environment, wherein the set of microphones are configured to acquire multiple channels of omni-directional audio signals. The system further includes one or more processors configured to: define a position of a viewer's head to coincide with a center of the audio signal acquisition environment; determine current positions of both the left and the right ears of the viewer's head; identify a subset of microphones within the set of microphones which is closest to the current positions of the left and right ears of the viewer's head; and compute a left channel and a right channel of audio output signals using the omni-directional audio signals recorded by the identified subset of microphones. The system also includes a set of audio output devices configured to playback the left channel and the right channel of audio output signals for the left ear and the right ear of the viewer, respectively.

FIG. 1 is a schematic top view of an example panoramic imaging system according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes cameras 101-108, a control system 110, and housing 120. Each of cameras 101-108 may be a digital camera. In some aspects, each of cameras 101-108 may include a wide-angle lens (e.g., fisheye lens) to capture image data. The horizontal angle of view of a wide-angle lens may be greater than 90 degrees and the vertical angle of view of a wide-angle lens may be greater than 90 degrees. FIG. 1 shows cameras 101-108 are distributed evenly across on a frame of housing 120, for example, on eight vertices of the frame with an octagon shape. Each of cameras 101-108 may face a ¼ of a 360° field, so that each direction of view will be covered by at least two cameras. It can be appreciated that cameras 101-108 may be distributed in any other arrangement and each of cameras 101-108 may face any portion of a 360° field. Furthermore, panoramic imaging system 100 may include additional cameras not shown in FIG. 1. For example, panoramic imaging system 100 may include multiple layers of cameras and the eight cameras shown in FIG. 1 may represent a single layer of cameras in the multi-layer camera system.

The control system 110 may include one or more electronic circuitries, such as a system on chip (SOC) with A field-programmable gate array (FPGA), Accelerated Processing Unit (APU) and peripheral electronic circuitries, for processing the image data captured by cameras 101-108 to produce wide to entire 360° panoramas, including both still images and movies. It can now be appreciated that outputs of panoramic imaging system 100 may be panoramas stitched from a set of original images captured by cameras 101-108.

Cameras 101-108 and the control system 110 may be enclosed in housing 120, such as a protective housing to reduce environmental effects on the components. In some embodiments, the protective housing is waterproof, dust-proof, shockproof, freeze-proof, or any combination thereof. In some aspects, housing 120 may include one or more mechanical parts for mounting, housing and/or moving the cameras 101-108 and/or other optical components. Furthermore, in some embodiments, cameras 101-108 can be reversibly coupled to or detached from the remaining system, such that an end user may select different models of cameras 101-108 to be used with panoramic imaging system 100 according to particular needs or preferences.

It can be appreciated that a variety of embodiments of cameras 101-108 may be employed. These embodiments may have different numbers and/or arrangements of cameras than cameras 101-108, but a common feature may be that each camera's field of view overlaps with that of at least one other camera, thereby enabling panoramic imaging system 100 to capture a total field of view according to the design. Another common feature may be that the number and arrangement of cameras in system 100 will ensure that, when panoramic imaging system 100 is used to shoot panoramic videos, target objects in any given direction are captured by at least two cameras in system 100 so that the target object show up in at least two binocular-vision/stereoscopic video images to be used to construct 3D images of the target objects.

Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
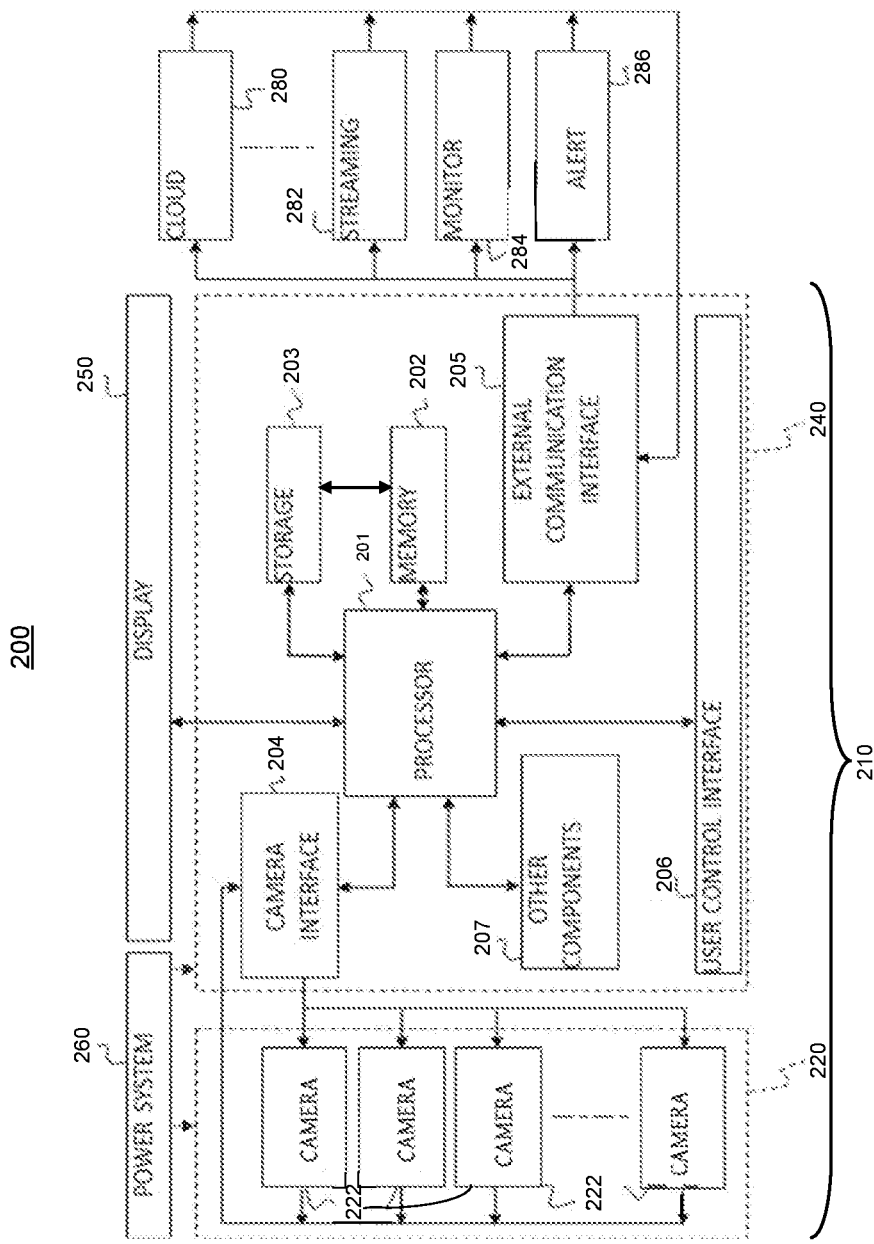
FIG. 2 conceptually illustrates an exemplary electronic system including a panoramic imaging system and various peripheral modules configured in an internet-enabled application environment with which some implementations of the subject technology can be implemented.

FIG. 2 conceptually illustrates an exemplary electronic system 200 including a panoramic imaging system 210 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic imaging system 210 within exemplary panoramic imaging electronic system 200 may be implemented by panoramic imaging system 100 as described above with reference to FIG. 1. According to the present disclosure, the example panoramic imaging system 210 further includes an optical system 220 which includes a plurality of cameras 222, and a control system 240 that controls the functions of the optical system 220 and includes at least an image processing program to process image data output from optical system 220. The plurality of cameras 222 may be implemented by cameras 101-108 in system 100. However, the plurality of cameras 222 may include fewer or more cameras than the eight cameras in system 100.

Control system 240 described in FIG. 2 may be used to implement control system 110 described in FIG. 1. Particularly, the control system 240 includes at least a processor 241, a memory 242, a storage device 243, a camera interface 244, an external communication interface 245, and a user control interface 246. The control system 240 can be a general-purpose computer system such as a Personal Computer (PC), or preferably a custom-designed computing system. Particularly in some embodiments, the control system 240 is a system on chip (SOC); that is, an integrated circuit (IC) integrates all components and functions of the control system 240 into a single chip, which makes the present panoramic imaging system 210 portable and electronically durable as a mobile device. In some embodiments, the control system 240 may be located internally within a same housing where the optical system 220 is located. Alternatively, in other embodiments, the control system 240 is separated from the optical system 220 to allow end users' selection of different models of an optical system 220 to be used with the control system 240.

The storage device 203 is preloaded with at least the audio and image processing programs of the present disclosure, including omni-directional audio signal acquisition, dynamic left and right audio channel generation and playback programs. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 201 carries out instructions of the various algorithms. Thus, the various software programs, stored on the storage device 203 and executed in the memory 202 by the processor 201, direct the control system 240 to act in concert with the optical system 220 to perform various functions, which include but are not limited to receiving commands from an end user or an external device or service 280, 282, 284 and 286, defining the precise geometry of the cameras 222, commanding the cameras 222 to capture raw image data, tagging and storing raw data and sensor signals in a local storage device 203 and/or commuting raw data to an external device or service 280, 282, 284 and 286, processing raw video data and position sensor signals to compute angular and linear positions of optical system 220 and subsequently generate adjusted and stabilized panoramic videos to account for the shaking and other motion disturbances of optical system 220, presenting generated stabilized panoramas on a local display 250 and/or communicating generated stabilized panoramas to be stored or presented on an external device or service 280, 282, 284 and 286.

The processor 201 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 240 may employ a multi-core processor that has two or more CPUs or array processors that have multiple processors operating in parallel. In some embodiments, the processor 201 is an application specific integrated circuit (ASIC) that is designed for a particular use rather than for general purpose use. Particularly, in some embodiments, the processor 201 is a digital signal processor (DSP) designed for digital signal processing. More particularly, in some embodiments, the processor 201 is an on-chip image processor, specialized for image processing in a portable camera system. In some embodiments, the control system 240 includes a graphic processing unit (GPU), which has a massively parallel architecture consisting of thousands of smaller, more efficient cores designed for handling multiple tasks simultaneously. Particularly, in some embodiments, the control system 240 may implement GPU-accelerated computing, which offloads compute-intensive portions of an algorithm to the GPU while keeping the remainder of the algorithm to run on the CPU.

The memory 202 and the storage 203 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 240 is a single chip system, the memory 202 and storage 203 blocks are also integrated on-chip with the processor 201 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 201 retrieves instructions to execute and data to process in order to execute the processes of some implementations.

The camera interface 204 of the present disclosure can be any form of command and data interface usable with a camera 222, such as a digital. The camera interface 204 of the present disclosure can also be any form of command and data interface to communicate with position sensors 224. Exemplary embodiments include USB, FireWire and any other interface for command and data transfer that may be commercially available. Additionally, it is preferred, although not required, that the optical system 220 be equipped with a single digital control line that would allow a single digital signal to command all the cameras 222 and sensors 224 simultaneously to capture an image of a scene and to acquire positional signals of the camera body.

The external communication interface 205 of the present disclosure can be any data communication interface, and may employ a wired, fiber-optic, wireless, or another method for connection with an external device or service 280, 282, 284 and 286. Ethernet, wireless-Ethernet, Bluetooth, USB, FireWire, USART, SPI are exemplary industry standards. In some embodiments, where the control system 240 is a single chip system, the external communication interface 205 is integrated on-chip with the processor 201 as well as other peripherals and interfaces.

The user control interface 206 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 240 of the present disclosure may further include other components 207 that facilitate its function. For example, control system 240 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 240 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 240 may optionally be equipped with a light sensor for environmental light conditions, so that control system 240 can automatically adjust hardware and/or software parameters of the system.

In some embodiments, the present electronic system 200 is further equipped with an internal power system 260 such as a battery or solar panel that supplies the electrical power. In other embodiments, electronic system 200 is supported by an external power source. In some embodiments, electronic system 200 is further equipped with a display 250, such that panoramic photos may be presented to a user instantly after image capture, and panoramic videos may be displayed to a user in real time as the scenes are being filmed.

In some embodiments, the present electronic system 200 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 280, online video streaming and file sharing 282, remote surveillance 284, and alert 286 for home and public security.

Figure 3:
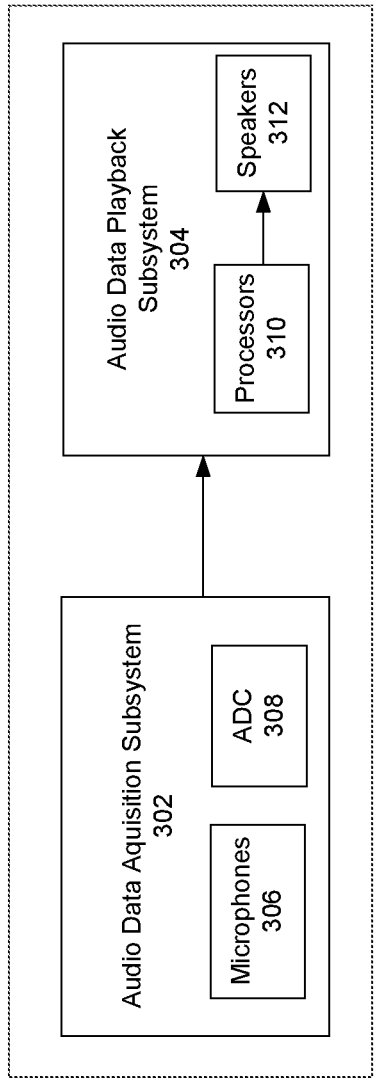
FIG. 3 shows a block diagram of an exemplary panoramic audio system in accordance with some embodiments described herein.

FIG. 3 shows a block diagram of an exemplary panoramic audio system 300 in accordance with some embodiments described herein. Note that panoramic audio system 300 may be integrated within panoramic imaging system 100 for capturing and playing back audio signals accompanying panoramic videos captured and played back by panoramic imaging system 100. As can be seen in FIG. 3, the exemplary panoramic audio system 300 includes an audio data acquisition subsystem 302 and an audio data playback subsystem 304. One of the main functions of audio data acquisition subsystem 302 is to perform 360° omni-directional audio signal collection. In some embodiments, audio data acquisition subsystem 302 includes a set of microphones 306 distributed in a discrete manner to collect multiple channels of audio signals from different directions within a 360°×180° full panoramic space. Audio data acquisition subsystem 302 can further include an AD conversion (ADC) unit 308 for converting the recorded analog audio signals by the set of microphones 306 to corresponding digital audio signals. More detailed embodiments of audio data acquisition subsystem 302 are provided below in conjunction with FIG. 4.

Audio data playback subsystem 304 further includes one or more processors 310 and a set of speakers 312. In some embodiments, audio data playback subsystem 304 is configured to process the audio signals recorded by audio data acquisition subsystem 302, generate multiple channels of audio signals to simulate a realistic sound field environment, and output the audio signals within a panoramic movie environment as left and right audio channels to present audiences with the realistic sound field environment. In some embodiments, to generate the realistic sound field environment to a viewer, one or more processors 310 are configured to perform the following operations: defining the position of the head of the viewer to be coinciding with the center of the audio signal acquisition; identifying a subset of microphones which are closest to the left and right ears of the viewer; and for each of left and right ears, computing a weighted combination of the audio signals recorded by the identified microphones closest to that ear to produce one of the left and right audio channels. Subsequently, the set of speakers 312 can output the generated left and right audio channels to the viewer's left and right ears, respectively. In some embodiments, the set of speakers 312 includes two speakers for outputting the synthesized left audio channel and the right audio channel, respectively. In other embodiments, the set of speakers 312 can be implemented as a headset for each viewer in the audience. More detailed embodiments of audio data playback subsystem 304 are provided below in conjunction with FIG. 5.

Figure 4:
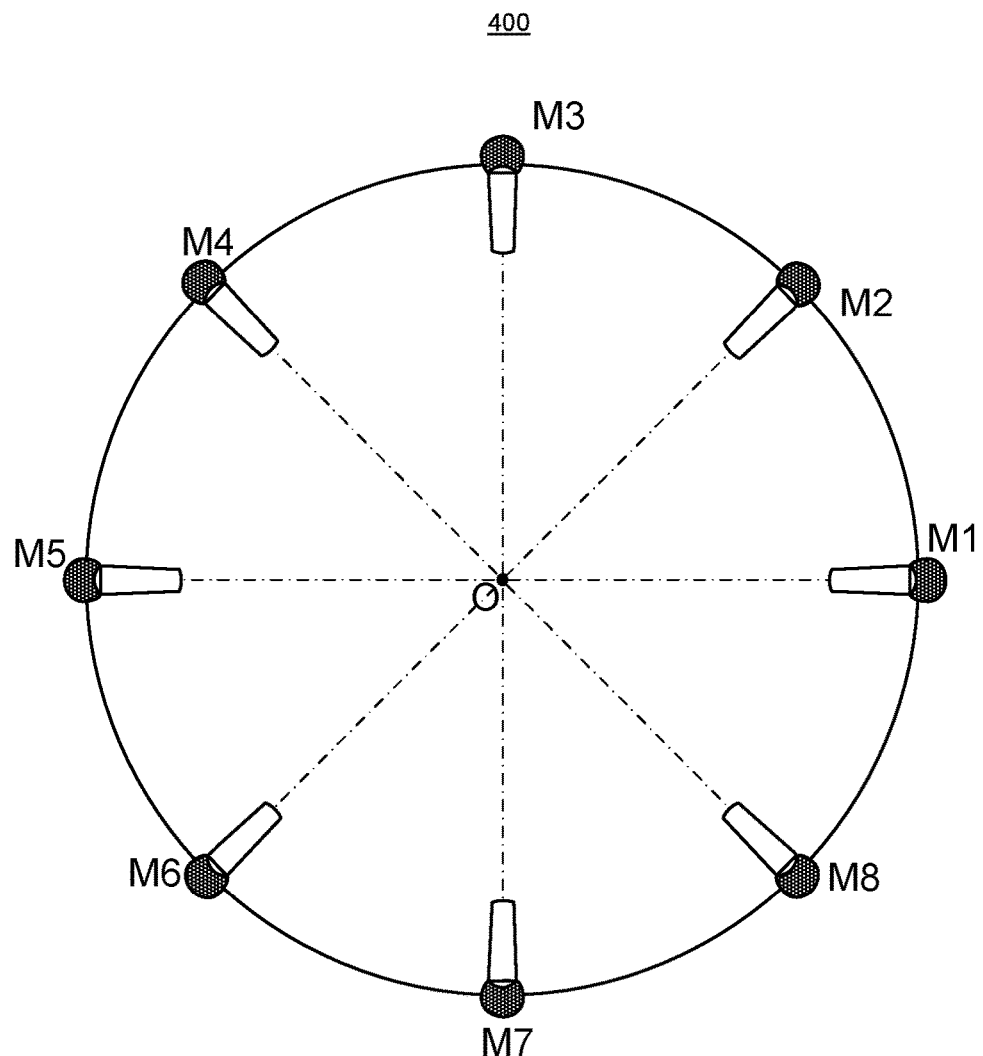
FIG. 4 shows an exemplary implementation of the audio data acquisition subsystem in the panoramic audio system of FIG. 3 in accordance with some embodiments described herein.

FIG. 4 shows an exemplary implementation 400 of the audio data acquisition subsystem 302 in system 300 in accordance with some embodiments described herein. As mentioned above, exemplary audio data acquisition subsystem 400 is configured to collect 360° omni-directional audio signals. In the embodiment shown, audio data acquisition subsystem 400 includes a center for audio acquisition, denoted as "O," which is considered as the location of a viewer's head. Audio data acquisition subsystem 400 includes a set of microphones M1 to M8 (or "M1-M8" hereinafter) which are laid out symmetrically around the center O. More specifically, eight microphones M1-M8 are positioned substantially on an equator of the 360°×180° full panoramic space to have substantially the same distance toward the center O. Also note that microphones M1-M8 are distributed in a discrete manner and evenly around the 360° circle at substantially a 45° angular spacing. In some embodiments, microphones M1-M8 are of substantially the same model and design. However, other embodiments of the present disclosure can use non-identical microphones.

In some embodiments, microphones M1-M8 are configured to acquire audio signals from eight different directions at 45° angular spacing. The set of eight microphones M1-M8 may be collocated with the set of eight cameras 101-108 within panoramic imaging system 100, i.e., each of the microphones M1-M8 is integrated with or placed in close proximity to one of the eight cameras 101-108. In these embodiments, the geometrical center of the set of microphones and the geometrical center of the set of cameras substantially coincide with each other. Moreover, microphones M1-M8 do not have to have one-on-one correspondences with cameras within a panoramic imaging system. For example, microphones M1-M8 can also operate with panoramic imaging systems using less than eight cameras. In one embodiment, a disclosed panoramic imaging system includes eight microphones and 3 cameras. In this embodiment, the geometrical center of the eight microphones and the geometrical center of the three cameras also substantially coincide with each other. Audio data acquisition subsystem 400 can further include an ADC unit for converting the recorded analog audio signals to corresponding digital signals, thereby generating eight channels of different digital audio streams. The multiple channels of audio streams become the inputs to audio data playback subsystem 304 of panoramic audio system 300.

Although the exemplary implementation 400 of audio data acquisition subsystem 302 includes eight microphones, other embodiments of audio data acquisition subsystem 302 can include a fewer or greater number of microphones to audio signal acquisition than the exemplary implementation 400 without departing from the scope of the present disclosure, so long as these microphones are distributed substantially evenly with respect to the center of the audio signal acquisition environment. Furthermore, while the exemplary implementation 400 of audio data acquisition subsystem 302 shows the set of microphones M1-M8 being positioned substantially on the same plane, other embodiments of audio data acquisition subsystem 302 can include a set of microphones arranged on more than one plane in space without departing from the scope of the present disclosure. For example, some embodiments of audio data acquisition subsystem 302 can have the set of microphones arranged in two or three layers in space.

Figure 5:
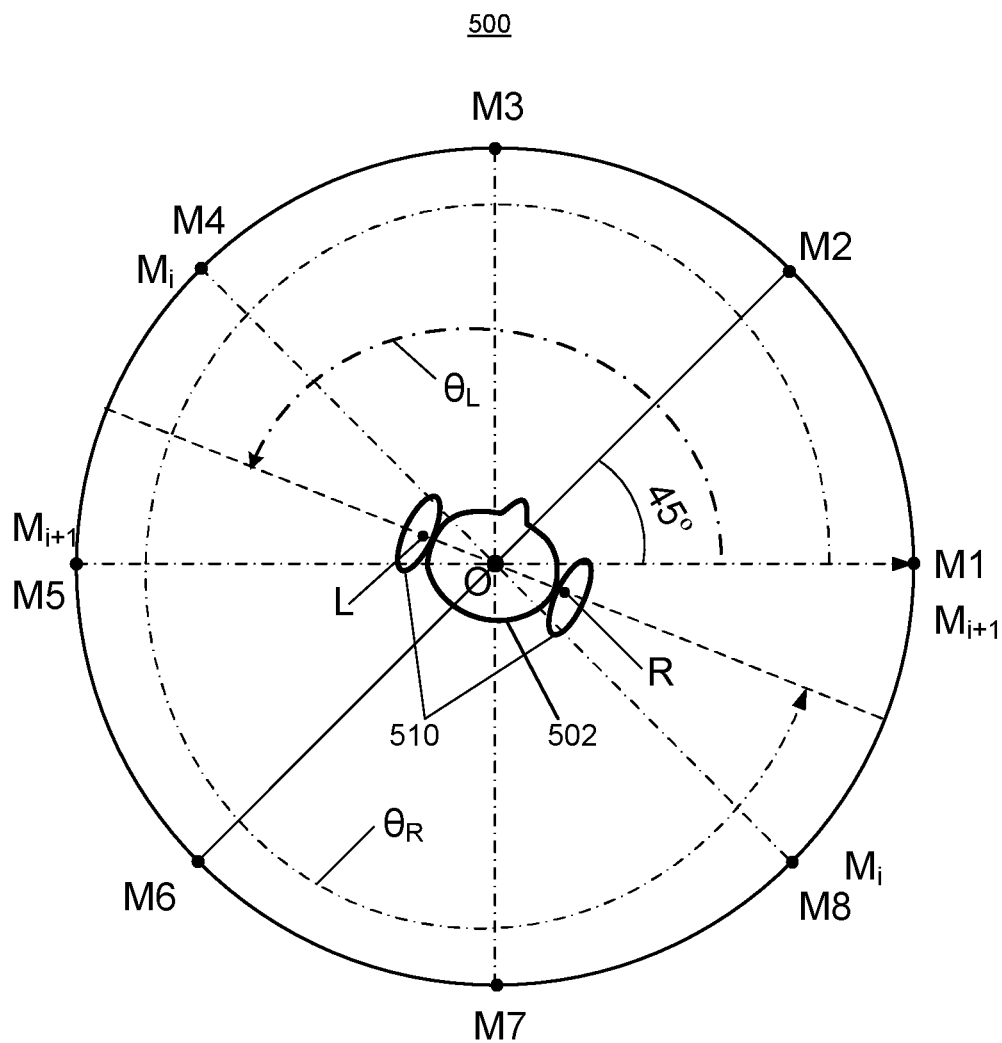
FIG. 5 shows an exemplary implementation of the audio data playback subsystem in the panoramic audio system of FIG. 3 in accordance with some embodiments described herein.

FIG. 5 shows an exemplary implementation 500 of audio data playback subsystem 304 in system 300 in accordance with some embodiments described herein. Note that the embodiment of FIG. 5 is an extension of audio data acquisition subsystem 400 above which shows locations of the set of microphones M1-M8. However, audio data playback subsystem 500 does not need to have the set of microphones M1-M8 to operate. As mentioned above, audio data playback subsystem 304 includes one or more processors and a set of speakers. The one or more processors are configured to process the audio signals recorded by audio data acquisition subsystem 302 and synthesize the multiple channels of recorded audio signals to generate the left and right audio channels to simulate a realistic sound field environment, whereas the set of speakers are configured to output the left and right audio channels within a panoramic movie environment to present audiences with the realistic sound field experience. In the implementation 500, the set of speakers are implemented as a headset 510 worn over the ears of a viewer. As mentioned above, the set of speakers can also be implemented as two speakers for outputting the synthesized left audio channel and the right audio channel, respectively.

More specifically, audio data playback subsystem 304 uses the one or more processors (not shown) to generate the two channels of audio signals, i.e., the left audio channel and right audio channel by: defining the position of the head of a viewer to be the center of the audio signal collection environment, e.g., the center "O" shown in FIG. 4; identifying a subset of microphones used to record the audio signals (e.g., M1-M8) which are closest to the left and right ears of the viewer; and for each of left and right ears of the viewer, computing a weighted combination of the audio signals recorded by the identified closest microphones to that ear to produce one of the left and right audio channels.

Referring to FIG. 5, note that the head 502 of an audience coincides with the center "O" of recording environment shown in FIG. 4. The position of the left ear of head 502 is denoted "L" whereas the position of the right ear of head 502 is denoted "R," and the line LR connecting the left and the right ears passes through the center O. Note that the rotation motion of head 502 is equivalent to rotating line LR about the center O. It should be understood that audio data playback subsystem 500 does not have to include the set of microphones. However, the locations of the set of microphones M1-M8 are shown in FIG. 5 simply to facilitate the discussion of the proposed left and right audio channels generation process.

One distinct feature of the disclosed technique is that, during a full panoramic video playback, as viewers change their viewing angles, e.g., by rotating their heads to watch the panoramic images from different directions, the synthesized audio signals of the left and right channels can be recalculated based on the new position and direction of viewers' heads, so as to match the sound effects with the changing panoramic visual effects received by the audience. In this manner, the disclosed panoramic audio system 300 creates a consistent panoramic visual and panoramic audio experience within a simulated reality environment.

More specifically, during panoramic video and audio playback using a panoramic imaging system, the processors within audio data playback subsystem 500 can be configured to determine a current direction of line LR connecting the left and the right ears of head 502. The processors subsequently identify a subset of microphones used to record the audio signals (e.g., M1-M8) which are closest to the new positions of the left and right ears of head 502 according to the direction of line LR. The processors then recalculate the left audio channel and right audio channel using a weighted combination of the audio signals recorded by the identified microphones. Next, the recalculated left and right channels of audio signals are played back to the left and right ears by headset 510 worn by the viewer at the current position and direction of the viewer's head 502.

We now use the exemplary audio data playback subsystem 500 to show the proposed dynamic audio channel synthesis technique. For example, in the exemplary implementation 500, the polar coordinates of the set of microphones M1-M8 are 0°, 45°, 90°, 135°, 180°, 225°, 270°, and 315°, respectively. The angular coordinates of positions L and R are denoted as "$\theta_L$," and "$\theta_R$," respectively. We further denote the audio stream data acquired by the eight microphones as $S_1$ to $S_8$, and the synthesized left and right audio data outputs to the left and right ears as $S_L$ and $S_R$, respectively.

Next, we determine the two closest microphones to the left ear, denoted as $M_i$ and $M_{i+1}$. As can be observed that using exemplary implementation 500, index i can be determined by:

$$i = INT(\theta_L/45°) + 1, \quad (1)$$

and in the exemplary implementation 500, $\theta_L \approx 157.5°$ and hence i=4. In other words, the identified microphones which are closest to the left ear are $M_4$ and $M_5$.

Next, the synthesized left audio channel output $S_L$ can be computed as the weighted sum of the audio data acquired by the identified microphones $M_i$ and $M_{i+1}$ using the following formulation:

$$S_L = ((\theta_L - (i-1)) \times 45° \times S_{i+1} + (i \times 45° - \theta_L) \times S_i)/45°. \quad (2)$$

For the exemplary implementation 500 using $\theta_L \approx 157.5°$ and i=4, Eqn. 2 becomes:

$$S_L = 0.5 \times S_4 + 0.5 \times S_5.$$

This makes sense because left ear L is positioned at about an equal distance to both microphones $M_4$ and $M_5$.

Similarly, for the right ear R and right audio channel, the two closest microphones $M_i$ and $M_{i+1}$ can be calculated using Eqn. 1, and in the exemplary implementation 500, $\theta_R \approx 337.5°$ and hence i=8. In other words, the identified microphones which are closest to the left ear are $M_8$ and $M_1$ ($M_1$ here is identical to $M_1$). Next, the synthesized right audio channel output $S_R$ can be computed as the weighted sum of the audio data acquired by the identified microphones $M_i$ and $M_{i+1}$ using the following formulation:

$$S_R = ((\theta_R - (i-1) \times 45°) \times S_{i+1} + (i \times 45° - \theta_R) \times S_i)/45°, \quad (3)$$

and in the exemplary implementation 500 and using $\theta_R$~337.5° and i=8, this equation becomes:

$$S_R = 0.5 \times S_1 + 0.5 \times S_8.$$

This result makes sense because the right ear R is positioned at about an equal distance to both microphones $M_1$ and $M_8$.

Figure 6:
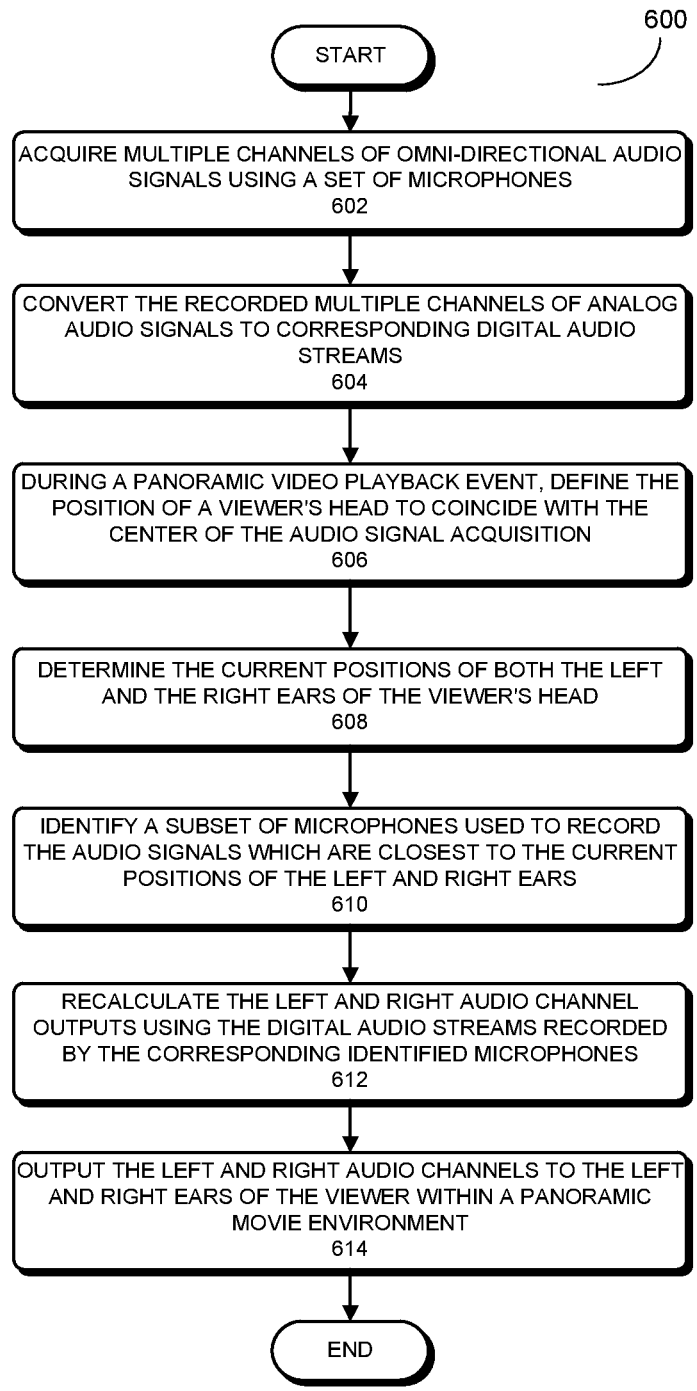
FIG. 6 presents a flowchart illustrating a process of dynamically generating audio output signals based on a viewer's viewing angle within a panoramic video environment in accordance with some embodiments described herein.

FIG. 6 presents a flowchart illustrating a process 600 of dynamically generating audio output signals based on a viewer's viewing angle within a panoramic video environment in accordance with some embodiments described herein. This process begins by acquiring multiple channels of omni-directional audio signals using a set of microphones (step 602). In some embodiments, the set of microphones are positioned such that they are distributed substantially evenly in a 360° plane with respect to a center of the audio signal acquisition environment. One of the exemplary systems for performing such omni-directional audio data acquisition is described above in conjunction with FIG. 4. As a result, audio waves in any given direction can be captured by at least one of the set of microphones. Next, the process converts the recorded multiple channels of analog audio signals to corresponding digital audio streams which can then be stored and played back at a later time (step 604).

During a panoramic video playback event, the process defines the position of a viewer's head to be coinciding with the center of the audio signal acquisition operation of 602 (step 606). The process then determines the current positions of both the left and the right ears of the viewer's head (step 608). The process subsequently identifies a subset of microphones used to record the audio signals which are closest to the current positions of the left and right ears of the viewer's head (step 610). In some embodiments, identifying the subset of the closest microphones includes identifying two closest microphones for each of the left and right ears.

Next, for each of the left and right ears, the process recalculates the corresponding left and right audio channel outputs using the digital audio streams recorded by the corresponding identified microphones (step 612). In some embodiments, recalculating the left or right audio channel outputs involves computing a weighted sum of the digital audio streams associated with the corresponding identified microphones. For example, to recalculate the left audio channel output for the left ear, the process can compute a weighted sum of the digital audio streams associated with two identified microphones closest to the left ear. Similarly, to recalculate the right audio channel output for the right ear, the process can compute a weighted sum of the digital audio streams associated with two identified microphones closest to the right ear. Finally, the process outputs the left and right audio channels to the left and right ears of the viewer within a panoramic movie environment so as to match the sound effects with the changing panoramic visual effects received by the audience (step 614).

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A computer implemented method for dynamically generating audio output signals based on a viewer's viewing angle within a panoramic video environment, the method comprising:
    acquiring multiple channels of omni-directional audio signals using a set of microphones positioned within an audio signal acquisition environment, wherein the set of microphones are positioned evenly with respect to a center of the audio signal acquisition environment;
    during panoramic video playback,
    defining a position of the viewer's head to coincide with a center of the audio signal acquisition environment; and
    determining current positions of both the left and the right ears of the viewer's head;
    identifying a subset of microphones within the set of microphones which is closest to the current positions of the left and right ears of the viewer's head; and
    computing multiple channels of audio output signals using the omni-directional audio signals recorded by the identified subset of microphones;
    playback the left channel and the right channel of audio output signals for the left ear and the right ear of the viewer, respectively.

2. The computer implemented method of claim 1, wherein after acquiring the multiple channels of omni-directional audio signals, the method further includes converting the multiple channels of omni-directional audio signals to corresponding digital audio streams which are subsequently stored.

3. The computer implemented method of claim 1, wherein positioning the set of microphones within the audio signal acquisition environment includes positioning the set of microphones evenly around a 360° circle at equal distances toward the center of the audio signal acquisition environment.

4. The computer implemented method of claim 3, wherein the set of microphones includes 8 microphones positioned at a 45° angular spacing around the 360° circle.

5. The computer implemented method of claim 3,
    wherein determining the current position of the left ear of the viewer's head includes determining a first angle formed between a first line connecting the left ear and the position of the viewer's head and a reference line connecting a reference point positioned on the 360° circle and the position of the viewer's head; and wherein determining the current position of the right ear of the viewer's head includes determining a second angle formed between a second line connecting the right ear and the position of the viewer's head and the reference line connecting the reference point and the position of the viewer's head.

6. The computer implemented method of claim 5, wherein identifying a subset of microphones closest to the current position of the left ear of the viewer's head includes:
for each microphone in the set of microphones,
determining an angle formed between a line connecting the microphone and the position of the viewer's head and the reference line; and
determining an angular difference between the angle with the first angle; and
identifying a first subset of microphones in the set of microphones which has the smallest angular differences.

7. The computer implemented method of claim 6, wherein identifying a subset of microphones closest to the current position of the right ear of the viewer's head includes:
for each microphone in the set of microphones,
determining an angle formed between a line connecting the microphone and the position of the viewer's head and the reference line; and
determining an angular difference between the angle with the second angle; and
identifying a second subset of microphones in the set of microphones which has the smallest angular differences.

8. The computer implemented method of claim 1, wherein computing multiple channels of audio output signals using the omni-directional audio signals recorded by the identified subset of microphones includes computing a left audio channel output for the left ear and a right audio channel output for the right ear.

9. The computer implemented method of claim 8,
wherein computing the left audio channel output for the left ear includes computing a first weighted combination of the audio signals recorded by the identified subset of microphones closest to the current position of the left ear; and
wherein computing the right audio channel output for the right ear includes computing a second weighted combination of the audio signals recorded by the identified subset of microphones closest to the current position of the right ear.

10. The computer implemented method of claim 1, wherein the method further includes outputting the left audio channel and the right audio channel for the left ear and the right ear of the viewer, respectively.

11. A non-transitory computer-readable storage medium storing instructions that when executed by a computer cause the computer to perform a method for dynamically generating audio output signals based on a viewer's viewing angle within a panoramic video environment, the method comprising:
acquiring multiple channels of omni-directional audio signals using a set of microphones positioned within an audio signal acquisition environment, wherein the set of microphones are positioned evenly around a 360° circle at equal distances with respect to a center of the audio signal acquisition environment;
during panoramic video playback,
defining a position of the viewer's head to coincide with a center of the audio signal acquisition environment; and
determining current positions of both the left and the right ears of the viewer's head;
identifying a subset of microphones within the set of microphones which is closest to the current positions of the left and right ears of the viewer's head; and
computing multiple channels of audio output signals using the omni-directional audio signals recorded by the identified subset of microphones;
playback the left channel and the right channel of audio output signals for the left ear and the right ear of the viewer, respectively.

12. The non-transitory computer-readable storage medium of claim 11, wherein after acquiring the multiple channels of omni-directional audio signals, the method further includes converting the multiple channels of omni-directional audio signals to corresponding digital audio streams which are subsequently stored.

13. The non-transitory computer-readable storage medium of claim 11,
wherein determining the current position of the left ear of the viewer's head includes determining a first angle formed between a first line connecting the left ear and the position of the viewer's head and a reference line connecting a reference point positioned on the 360° circle and the position of the viewer's head; and
wherein determining the current position of the right ear of the viewer's head includes determining a second angle formed between a second line connecting the right ear and the position of the viewer's head and the reference line connecting the reference point and the position of the viewer's head.

14. The non-transitory computer-readable storage medium of claim 13, wherein identifying a subset of microphones closest to the current position of the left ear of the viewer's head includes:
for each microphone in the set of microphones,
determining an angle formed between a line connecting the microphone and the position of the viewer's head and the reference line; and
determining an angular difference between the angle with the first angle; and
identifying a first subset of microphones in the set of microphones which has the smallest angular differences.

15. The non-transitory computer-readable storage medium of claim 14, wherein identifying a subset of microphones closest to the current position of the right ear of the viewer's head includes:
for each microphone in the set of microphones,
determining an angle formed between a line connecting the microphone and the position of the viewer's head and the reference line; and
determining an angular difference between the angle with the second angle; and
identifying a second subset of microphones in the set of microphones which has the smallest angular differences.

16. The non-transitory computer-readable storage medium of claim 11, wherein computing multiple channels of audio output signals using the omni-directional audio signals recorded by the identified subset of microphones includes computing a left audio channel output for the left ear and a right audio channel output for the right ear.

17. The non-transitory computer-readable storage medium of claim 16,
- wherein computing the left audio channel output for the left ear includes computing a first weighted combination of the audio signals recorded by the identified subset of microphones closest to the current position of the left ear; and
- wherein computing the right audio channel output for the right ear includes computing a second weighted combination of the audio signals recorded by the identified subset of microphones closest to the current position of the right ear.

18. The non-transitory computer-readable storage medium of claim 11, wherein the method further includes outputting the left audio channel and the right audio channel for the left ear and the right ear of the viewer, respectively.

19. An omni-directional audio signal acquisition and playback system, comprising:
- a set of microphones positioned evenly with respect to a center of the audio signal acquisition environment, wherein the set of microphones are configured to acquire multiple channels of omni-directional audio signals;
- one or more processors configured to:
  - define a position of a viewer's head to coincide with a center of the audio signal acquisition environment;
  - determine current positions of both the left and the right ears of the viewer's head;
  - identify a subset of microphones within the set of microphones which is closest to the current positions of the left and right ears of the viewer's head; and
  - compute a left channel and a right channel of audio output signals using the omni-directional audio signals recorded by the identified subset of microphones; and
- a set of audio output devices configured to playback the left channel and the right channel of audio output signals for the left ear and the right ear of the viewer, respectively.

20. The omni-directional audio signal acquisition and playback system of claim 19, further comprising an AD conversion (ADC) unit configured to convert the multiple channels of omni-directional audio signals to corresponding digital audio streams.

* * * * *